Dec. 19, 1967    G. L. ROBERTS ET AL    3,359,070
PROCESS FOR TiO₂ PIGMENT PRODUCTION IN CONTROLLED
CALCINATION OF BASIC TITANIUM SULFATE
Filed Sept. 24, 1964

INVENTORS.
GEORGE L. ROBERTS
HAROLD E. HOELSCHER
WINFRED J. CAUWENBERG

BY Theodore P. Virgil

ATTORNEY

३,३५९,०७०
Patented Dec. 19, 1967

3,359,070
PROCESS FOR TiO$_2$ PIGMENT PRODUCTION IN CONTROLLED CALCINATION OF BASIC TITANIUM SULFATE
George Leathwhite Roberts, Lynchburg, Va., Harold Ewald Hoelscher, Baltimore, Md., and Winfred Joseph Cauwenberg, Amherst, Va., assignors to American Cyanamid Company, Stamford, Conn., a corporation of Maine
Filed Sept. 24, 1964, Ser. No. 399,054
4 Claims. (Cl. 23—202)

ABSTRACT OF THE DISCLOSURE

The present invention is concerned with the manufacture of titanium dioxide pigments in a rotary calciner designed to control the time and temperature relationships during the calcination process so that an improved pigment with fewer aggregates and sinters is produced. The invention involves the use of a cylindrical kiln which contains a retaining wall placed at a point in the kiln so that the retention time of the pigment will be longer in a zone in which the temperature is maintained slightly below the maximum temperature occurring in the kiln.

---

Figure 1:
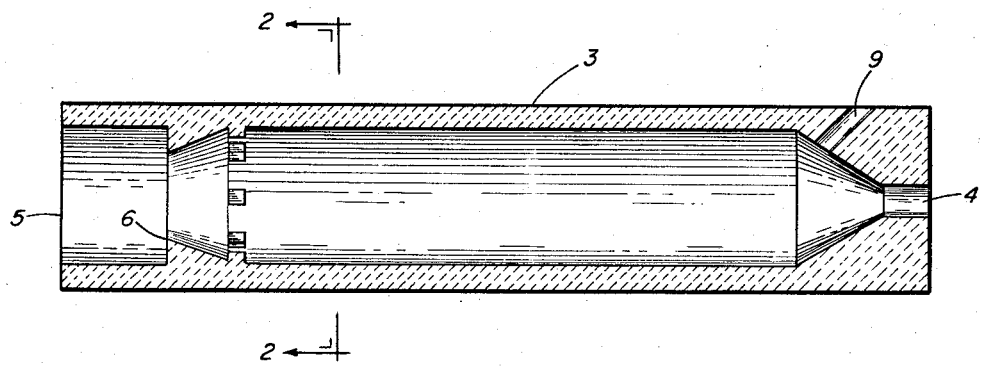

This invention relates to improved method and means of calcining basic titanium sulfate for the purpose of producing titanium dioxide, which is suitable as a pigmentary material.

In conventional kilns where basic titanium sulfate is heated to an elevated temperature to dry and convert the same to pigmentary titanium dioxide, unfortunately an undesirable amount of the titanium dioxide sinters or develops into an unusually large particle or aggregate that is of inferior pigment quality. Whenever the capacity of the kiln was increased by using a restricted opening at the discharge end, it was found that an undesirable amount of aggregates and sintered particles were produced. An investigation of the factors involved in calcination in which a dam of restricted opening at the discharge end of the kiln was employed, revealed that a certain amount of material being treated was held for an abnormally long period of time within the kiln at elevated temperatures. While this would be an expected concomitant result of increased residence time in the kiln, it was also found that some of the material failed to flow in the expected manner through the kiln even when the residence time remained essentially constant. It was determined that the normal solid movement was retarded and some material was held up for abnormally long periods in certain regions of the kiln with the result that the production of aggregates was further increased when the throughput of solid to the kiln was increased. In the production of the pigmentary titanium dioxide, it is customary for unusual production demands to be made, and therefore, it is of utmost importance that a solution be found to the problem of poor pigment quality whenever the capacity of the kiln is increased to meet the greater commercial demand. Through extensive investigation, quite unexpectedly, we discovered that a conventional kiln could be easily and economically modified to increase the throughput of pigmentary TiO$_2$ without encountering the disadvantages of the prior practice.

Accordingly an object of this invention is to provide a method of increasing the throughput of a conventional kiln and significantly reducing the amount of aggregates and sintered material which are normally obtained in conventional practices.

Another object of the present invention is to provide a method of calcining basic titanium sulfate to produce pigmentary titanium dioxide of improved quality over products which are calcined by conventional means.

Other objectives and advantages of this invention will become apparent from the following description and explanation thereof.

By means of the present invention, basic titanium sulfate is calcined to produce either rutile or anatase pigmentary titanium dioxide. For the production of rutile pigment, the basic titanium sulfate flows downwardly in an elongated vessel containing an upper drying zone, a middle crystal transformation zone, and a lower crystal growth zone. Within the crystal transformation zone, a reduced cross-sectional flow area is present for the purpose of increasing the residence time of the material passing therethrough, without increasing the residence time of the material being treated in the crystal growth zone. For the production of anatase pigment, the calcination vessel is divided into a drying zone and a crystallization zone. A zone of reduced cross-sectional flow area is present within the crystallization zone for the purpose of increasing the residence time of the material being treated at a temperature of about 600° C. to 925° C.

For the purpose of the present invention, any basic titanium sulfate can be used as the starting material for the production of anatase or rutile pigment. Basic titanium sulfate may be produced by reacting a titaniferous ore material or a titanium dioxide containing material with sulfuric acid at a temperature, for example, of about 180° C. to 200° C. The reaction product thus obtained is dissolved in dilute sulfuric acid, containing about 15–30% by weight sulfuric acid. Any unreacted residual material is separated from the diluted reaction product by sedimentation or filtration. The titanium containing material is treated with iron metal to reduce any iron present in the ferric form to the ferrous state and also to reduce a portion of the titanic material to titanous material. Following the treatment with metallic iron, the material undergoes a series of crystallization and evaporation steps whereby the basic titanium sulfate is produced. All of the steps by which basic titanium sulfate is obtained are well known to those skilled in the art, and consequently, it is not necessary to describe them herein. In any event, it is contemplated for the purpose of this invention to employ any basic titanium sulfate which is made by any method and requires calcination to obtain pigmentary material.

In the production of rutile pigment, the basic titanium sulfate is combined with rutile seed in an amount of about 1 to 5% by weight. The rutile seed may be prepared by the method described in U.S. Patent No. 2,406,469. The rutile seed serves to convert the amorphous material to rutile titanium dioxide at a temperature of at least about 700° C. The basic titanium sulfate contains a large amount of water, ranging in the order of about 40 to 60% by weight of the total material being charged to the calciner. The relative amount of water present in the material being fed to the calciner is not critical for the purpose of this invention, because any quantity of water can be removed by lengthening or shortening the drying section of the calciner. The basic titanium sulfate also contains about 5 to 15% by weight of sulfate measured as SO$_3$. Flux material such as potassium sulfate may also be added to the basic titanium sulfate to facilitate particle growth of the anhydrous material as described in U.S. Patent No. 2,369,246. The remainder of the basic titanium sulfate is titanium containing material, which is generally referred to as TiO$_2$.

Within the drying zone of the calciner, water and SO$_3$ are removed from the material being treated. For proper conversion of anatase to rutile, it is preferred that all, or substantially all, the SO$_3$ be removed from the material being treated within the drying zone. In the drying zone, hot gaseous material flows counter-currently to the solid material being treated. As the solid feed entrance of the calciner, the gaseous material is at a temperature of about 75° C. to 500° C., preferably about 175° C. to 300° C., and the solid material is at a temperature of about 20° C. to 100° C., preferably about 50° C. to 75° C. At the discharge end of the drying zone, the gaseous material is at a temperature of about 500° C. to 1000° C., preferably about 800° C. to 950° C., and the solid material is at a temperature of about 700° C. to 950° C., preferably about 800° C. to 900° C. The material leaving the drying zone may contain a small amount of water and $SO_3$, viz, about .01 to 5% by weight of the solid material, or, in general, less than about .5% by weight on the same basis. Any finely divided pigmentary material which escapes with the gaseous material being discharged from the kiln is recycled to the drying zone, preferably with the basic titanium sulfate feed material. When such fine materials are recycled to the drying step, the rutile content of the material being dried may be as high as 15% by weight; more usually up to 10% by weight of the feed material.

The material leaving the drying zone of the kiln contains practically all anatase crystals except for the rutile originally added to the basic titanium sulfate feed material. The anatase material flows into the crystal transformation zone where the temperature is sufficient to effect the conversion from anatase to rutile material. At the entrance of the crystal transformation zone, the temperature of the gaseous material is about 850° C. to 950° C., preferably about 875° C. to 925° C., and the solid material is at a temperature of about 800° C. to 875° C., preferably about 820° C. to 860° C. At the discharge of the crystal transformation zone, the incoming gaseous material is at a temperature of about 950° C. to 1050° C., preferably about 975° C. to 1025° C., and the solid material is at a temperature of about 925° C. to 1025° C., preferably about 950° C. to 1000° C. Within the crystal transformation zone, the anatase material is converted to rutile and the rutile thus converted may also undergo crystal size growth. It is important in commercial operations that the rutile conversion occur as quickly as possible, otherwise it may be necessary to use unusually large sized kilns to produce rutile pigment. By means of the present invention the rate of rutile conversion is enhanced appreciably by the use of a dam or an opening of restricted cross-sectional area in the crystal transformation zone. By using a restricted opening, the residence time of the material being treated is increased and in that way provides better conditions under which rutile conversion may occur.

The rate of conversion to rutile is preferably accomplished at the temperature specified hereinabove for the crystal transformation zone. At low temperatures, such as those encountered in the drying zone of the kiln, the rutile conversion may be too low for practical commercial operations. On the other hand, the elevated temperatures which are present in the crystal growth zone of the kiln promote crystal size growth too rapidly from the standpoint of obtaining a good pigment quality. Thus it is preferred that crystal transformation occur, as much as possible, within the zone provided in the kiln for that purpose. Furthermore, it is preferred that the residence time of the solid material within the crystal transformation zone is sufficient to provide at least 99.5% conversion of anatase to rutile. As might be expected, the residence time will vary depending upon the temperature employed in the crystal transformation step. As the temperature increases, the residence time needed to effect the desired rutile conversion will decrease. In general, the residence time of the solid material in the crystal transformation zone depends upon the size of the kiln and varies from 1 to 10 hours, more usually about 1.5 to 5 hours.

In the last step of the calcination treatment, the rutile is grown in particle size to form the desired pigmentary material. At the entrance of the crystal growth zone, the gaseous material is at a temperature of about 950° C. to 1050° C., preferably about 975° C. to 1025° C., and the solid material is usually about 10° C. to 20° C lower in temperature than the gaseous material. The temperatures of the gaseous and solid material at the exit of the kiln or the crystal growth zone are about the same as those given for the entrance of the crystal growth zone. The pigment leaving the kiln may have an average particle size of about .05 to 0.3 micron.

With respect to the various processing zones described above, the temperature employed in each of them may vary with the kind of solid feed material being used or treated. Also, some overlap in temperature conditions may exist among the zones so that as to part of each zone more than one reaction or physical change may occur simultaneously.

The kiln is inclined at an angle from the horizontal in order that the materials being treated may flow downwardly without any assistance except for gravity, the rotation of the kiln and lifting flights which will be described in greater detail hereinbelow. The present invention contemplates using a kiln which contains only a minor amount of solid material relative to the volume of the kiln, namely, not greater than 40% of the cross-sectional area of the kiln, more usually about 2 to 20% on the same basis. For this purpose, the kiln is inclined at an angle of about ½° to 10°, more usually about 1½° to 5° with respect to horizontal position. The kiln is rotated to facilitate the downward movement of solid material, for example, at about 5 to 50 revolutions per hour, more usually about 10 to 30 revolutions per hour. The dam located within the crystal transformation zone is circular in shape and occupies about 10 to 40%, preferably about 20 to 30% of the cross-sectional area of the kiln.

Since there is a tendency for solid material to accumulate at the upstream part of the dam, it is preferred that lifting flights be installed at the upstream part of the dam for the purpose of moving material which accumulates in that region of the dam. The lifting flights may be baffles, bricks or any other member and may be positioned at an oblique or right angle to the dam. They project from the interior wall of the dam sufficiently to lift solid material lying between adjacent flights and causing the same to fall to another part of the kiln during its rotation. An improvement in operation is effected with the lifting flights even if the dam is located at the discharge end of the kiln. As might be expected, the preferred flight is positioned at right angles to the dam and may project to as high as the dam or even beyond the same. The number of flights employed on the upstream side of the dam is governed by the size of the kiln and the amount of material being processed through it. The plurality of flights may be in diametric opposition to each other or otherwise and may be as high as 10 or more in number.

To provide a further understanding of the present invention, reference will now be had to specific examples thereof.

Figure 2:
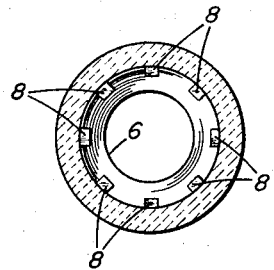

In the accompanying drawing which forms a part of this specification, FIGURE 1 is a schematic planar view of a kiln containing the dam construction of the present invention and FIGURE 2 is a view taken along lines 2—2.

In the drawing the kiln 3 has a length of 125 feet and an internal diameter of 6′ 6″ and is inclined at an angle of about ⅜″ per liner foot of length. Basic titanium sulfate containing 35% $TiO_2$, 60% $H_2O$, 5% $SO_3$ and 2% of rutile seed (included in the $TiO_2$) is fed to the inlet 4 at the rate of 4 tons per hour. The feed has a temperature of about 60° C. At the discharge end 5, hot combustion gases are introduced into the kiln at a temperature of 1800° C., produced from the combustion of fuel oil with air. Within the kiln 3, is situated a circular dam 6 which creates an internal opening having a diameter of 5 feet. The dam 6 is located a distance of 12 feet from the discharge end 5 of the kiln. At equidistant points on the inside wall of the kiln and at a place where the dam begins to shape to its maximum height there are positioned eight flights 8. The flights are of similar size, namely, 16″ in length, 6″ in width and stand about 6″ in height, measured from the wall of the kiln. The hot gases entering the kiln at the discharge end 5 travel throughout its length before being discharged from the gas outlet 9 at a temperature of 450° C. Rutile pigment leaves the kiln at a rate of 1.2 tons per hour.

In order to demonstrate the relative effectiveness of the dam shown in FIGURES 1 and 2, a comparison was made with a kiln in which the dam of the type shown in FIGURES 1 and 2 was located at the discharge end 5 and no flights were used. The pigment retention times for both systems are given in Table I.

TABLE I

| Distance of Measurement from Discharge end (feet) | Retention time (minutes) of solid from distance of measurement to discharge end of kiln | |
|---|---|---|
| | Dam at Discharge | Dam at 12 feet |
| 6 | 25.5 | 7.75 |
| 12 | 43.75 | 19.25 |
| 16 | 60.5 | 29.75 |
| 20 | 75.0 | 44.0 |
| 24 | 85.0 | 54.5 |
| 26 | 90.0 | 60.25 |
| 78 | 308.0 | 254.00 |
| 109 | 445.0 | 374.00 |

The effect of the position of the dam upon temperature of the solids is shown in Table II.

TABLE II

| Distance of Point of Measurement to Discharge end in Feet | Pigment temperature (° C.) at point of measurement | | |
|---|---|---|---|
| | Dam at Discharge | Dam at 12 feet from Discharge | Dam at 12′ w/ 10% increase in capacity |
| 6 | 986 | 998 | 1,001 |
| 12 | 979 | 989 | 992 |
| 16 | 972 | 984 | 979 |
| 20 | 958 | 969 | 944 |
| 24 | 943 | 959 | 920 |
| 26 | 937 | 955 | 908 |
| 78 | 253 | 288 | 286 |
| 109 | 83 | 83 | 88 |

In Table III below, the effect of the position of the dam upon pigment quality is shown.

TABLE III

| Distance of Point of Measurement to Discharge End (feet) | Tinting Strength of Pigment | | |
|---|---|---|---|
| | Point at Discharge | Point at 12′ from Discharge | Point at 12′ w/10% increase in capacity |
| 0 | 1,600 Br 2 | 1,630 Br 2 | 1,640 Br 2. |
| 6 | 1,650 STD | 1,600 STD | 1,630 Br 1. |
| 12 | 1,590 Bl 2 | 1,550 Bl 1 | 1,690 Br 1. |
| 16 | 1,550 Bl 3 | 1,540 Bl 3 | 1,600 Bl 2. |
| 21 | 1,450 Bl 4 | 1,510 Bl 4 | 1,500 Bl 3. |
| 27 | 1,260 Bl 5 | 1,400 Bl 6 | 940 Bl 6. |
| | Color* of Pigment | | |
| 0 | 95 STD | 96 Bl 1 | 96 Bl 1. |
| 6 | 96 Bl 1 | 97 Bl 1 | 96 Bl 1. |
| 12 | 96 Bl 1 | 97 STD | 96 Bl 1. |
| 16 | 97 Bl 1 | 97 STD | 96 Bl 1. |
| 21 | 94 Bl 1 | 96 Bl 1 | 92 Bl 2. |
| 27 | 92 Bl 1 | 92 Bl 1 | 95 Bl 1. |

*Color index and Tint Tone—Bl=Blue; Br=Brown; STD= equal to standard.

The effect of dam position upon rutile crystal size is given in Table IV below.

TABLE IV

| Distance of Point of Measurement to Discharge (feet) | Rutile Crystal Size, Angstroms | | |
|---|---|---|---|
| | Dam at Discharge | Dam 12′ from Discharge | Dam 12′ from Discharge w/10% incr. in capacity |
| 0 | | 938 | 910 |
| 6 | 1,200 | 953 | 954 |
| 12 | 950 | 953 | 910 |
| 16 | 930 | 883 | 852 |
| 21 | 870 | 791 | 785 |
| 27 | 730 | 805 | 731 |
| 31 | | 628 | 652 |
| 35 | 427 | 400 | 360 |
| 41 | | | 260 |
| 79 | 78 | 85 | 97 |

The effect of dam location upon the solids content of the material being treated is shown in Table V below.

TABLE V

| Distance of Point of Measurement to Discharge (feet) | 10% Solids Content | | |
|---|---|---|---|
| | Dam at Discharge | Dam 12′ from Discharge | Dam 12′ from Discharge w/10% incr. in capacity |
| 27 | 99.6 | | 99.5 |
| 31 | | 99.6 | |
| 35 | 98.2 | | 98.7 |
| 41 | 93.8 | 98.1 | 95.8 |
| 49 | | 95.2 | |
| 58 | | 91.4 | 89.1 |
| 79 | 62.7 | 64.4 | |
| 91 | 54.9 | 62.6 | 87.6 |
| 109 | 55.8 | 51.4 | |
| 125 | 36.6 | 36.6 | 37.6 |

The effect of moving the dam position upon rutile content of the solids in the kiln at various points of measurement is shown in Table VI.

TABLE VI

| Distance of Point of Measurement from Discharge (feet) | Percent Rutile Content | | |
|---|---|---|---|
| | Dam at Discharge | Dam 12′ from Discharge | Dam 12′ from Discharge w/10% increase in capacity |
| 0 | 99.6 | 99.8 | 99.7 |
| 6 | 98.5 | 99.3 | 99.4 |
| 12 | 95.8 | 97.9 | 95.6 |
| 16 | 89.5 | 96.6 | 91.0 |
| 21 | 77.6 | 90.3 | 73.0 |
| 27 | 49.2 | 72.0 | 36.0 |
| 31 | | 33.0 | 22.0 |
| 35 | 13.3 | 15.0 | 17.6 |
| 41 | 10.0 | 10.0 | 10.0 |
| 49 | | | 10.0 |

The data given above demonstrate that the solids have a lower retention time in the zone of high temperature at which undesirable sintering and aggregate formations occur. 10–15% increase in capacity can be realized by placing the dam inwardly from the discharge end. The quality of the pigment is better at equal rates, which shows that less sintering and aggregate formation take place.

We claim:

1. A calcination process for the production of rutile pigment which comprises an elongated rotating calcination zone which is inclined at an angle of about 0.5 to 10° from a horizontal position to facilitate the downward flow of basic titanium sulfate being treated therein as a shallow flowing bed, said calcination zone comprising an upper drying section, a middle crystal transformation section and a lower crystal growth section, introducing basic titanium sulfate into the upper end of the calcination zone, passing hot gases into the lower end of the calcination zone for countercurrent flow with the said basic titanium sulfate, a zone of reduced cross-sectional area being positioned in the crystal transformation zone and having about 60 to 90% of the cross-sectional area of the calcination zone whereby the residence time of the solids in the said crystal transformation zone is increased.

2. The process of claim 1 wherein an agitation zone is positioned upstream of the reduced cross-sectional area zone to prevent unduly long detention time for the solids flowing therethrough.

3. The process of claim 1 wherein the temperature of solids in the crystal transformation zone being about 800° C. to 875° C. at the entrance thereof and about 925° C. to 1025° C. at the exit thereof.

4. A calcination process for the production of anatase pigment which comprises an elongated calcination zone which is inclined at an angle of about 0.5 to 10° from a horizontal position to facilitate the downward flow of basic titanium sulfate being treated therein as a shallow flowing bed, said calcination zone comprising an upper drying section and a lower crystallization section, introducing basic titanium sulfate to the upper end of said calcination zone and hot gases to the lower end thereof, a zone of reduced cross-sectional area being positioned within the crystallization zone and having about 60 to 90% of the cross-sectional area of the calcination zone, whereby the residence time of the solids being subjected to a temperature of about 600° C. to 925° C. is increased.

References Cited

UNITED STATES PATENTS

| | | | |
|---|---|---|---|
| 2,269,139 | 1/1942 | Booge | 23—202 |
| 2,290,112 | 7/1942 | Merriam et al. | 23—202 |
| 2,507,729 | 5/1950 | McKinney | 23—202 |
| 3,105,744 | 10/1963 | Luethge | 23—202 |
| 3,107,150 | 10/1963 | Angerman | 23—202 |
| 3,253,888 | 5/1966 | Daubenspeck | 23—202 |

OSCAR R. VERTIZ, *Primary Examiner.*

EDWARD STERN, *Examiner.*